United States Patent
Davia et al.

(10) Patent No.: US 7,603,660 B2
(45) Date of Patent: Oct. 13, 2009

(54) CODE COVERAGE TEST SELECTION

(75) Inventors: Brian Dravo Davia, Seattle, WA (US); Curtis Dean Anderson, Kent, WA (US); Loren James Merriman, Duvall, WA (US); Patrick Joseph Niemeyer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 881 days.

(21) Appl. No.: 11/142,155

(22) Filed: Jun. 1, 2005

(65) Prior Publication Data

US 2006/0277439 A1 Dec. 7, 2006

(51) Int. Cl.
*G06F 9/44* (2006.01)
(52) U.S. Cl. .................... 717/128; 717/103; 717/133
(58) Field of Classification Search ................ None
See application file for complete search history.

(56) References Cited

U.S. PATENT DOCUMENTS 7,165,074 B2 * 1/2007 Avvari et al. ................ 707/102

OTHER PUBLICATIONS

"Code coverage based technique for prioritizing test cases for regression testing", Aggrawal et al., Sep. 2004, pp. 1-4. Online retrieved at <http://delivery.acm.org/10.1145/1030000/1022511/p1-aggrawal.pdf>.*
"Efficient use of code coverage in large-scale software development", Y. Kim, Dec. 2003, pp. 145-155. Online retrieved at <http://delivery.acm.org/10.1145/970000/961347/p145-kim.pdf>.*
"Efficient instrumentation for code coverage testing", Tikir et al., Dec. 2002, pp. 86-96. Online retrieved at <http://delivery.acm.org/10.1145/570000/566186/p86-tikir.pdf>.*

* cited by examiner

*Primary Examiner*—Tuan Q Dam
*Assistant Examiner*—Thuy Dao
(74) *Attorney, Agent, or Firm*—Merchant & Gould; Ryan T. Grace

(57) ABSTRACT

A system and method for testing modified code paths without testing unmodified code paths is described. During testing of the baseline build of a program, code coverage data is generated. The code coverage data identifies which test implicates which code path of the baseline build. When a modification of the baseline build is made, the modified build may be differentiated to determine what code of the modified build was changed. When the modified build is differentiated, the code coverage data for the modified code path is mapped to appropriate tests. The tests may then be used to test the changed code path without requiring testing of all the code paths of the modified build.

15 Claims, 7 Drawing Sheets

CODE COVERAGE TEST SELECTION

BACKGROUND

The development of new programs for computing devices is an extensive, time consuming, and tedious process that requires thousands of man-hours and thousands of machine-hours. Typically, a program is developed piecemeal by a group of developers. Once the program has been developed, the entire program is submitted to a group of testers for testing. When modifications are made to the program, the entire program is resubmitted and retested regardless of the extent of the modifications.

Such a system for program development may be sufficient for small programming projects; however, as the size of the programming code increases, so does the man-hour and machine-hour requirements for testing. For example, a large program development may require over nine hundred developers writing upwards of forty-five million lines of code. These lines of code must be tested. For such a large project, over thirteen hundred testers may be required to write the nearly thirty thousand tests for testing such a program. Testing such a program may take upwards of twelve hundred machine hours.

Typically, during the development process, programs are modified. When modifications are made to the program, the entire program is resubmitted for testing even if a very small modification is made to the program. This may require all the tests to be executed again, even on portions of the program that have not changed. Such inefficient testing consumes man-hours, machine-hours, development time, and discourages developers from testing code.

SUMMARY

This Summary is provided to introduce a selection of concepts in a simplified form that are further detailed below in the Detailed Description. This Summary is not intended to identify key features or essential features of the claimed subject matter, nor is it intended to be used as an aid in determining the scope of the claimed subject matter.

Aspects of the present disclosure include code coverage test selection in order to increase efficiency of testing code data. Aspects of the disclosure include generating a baseline program build and testing the baseline build with one or more tests. Other aspects of the disclosure include generating code coverage data of the baseline build. Still other aspects of the invention include generating a modified build and comparing the modified build to the baseline build to determine what code has been modified. After identifying modified code, the modified code is associated with the code coverage data of the baseline build. The code coverage data identifies the test(s) that are associated with the modified code. The test(s) that are associated with the modified code are executed to test the modified code.

A more complete appreciation of aspects of the present disclosure and its improvements can be obtained by reference to the accompanying drawings, to the detailed description, and to the appended claims.

DETAILED DESCRIPTION

Figure 1:
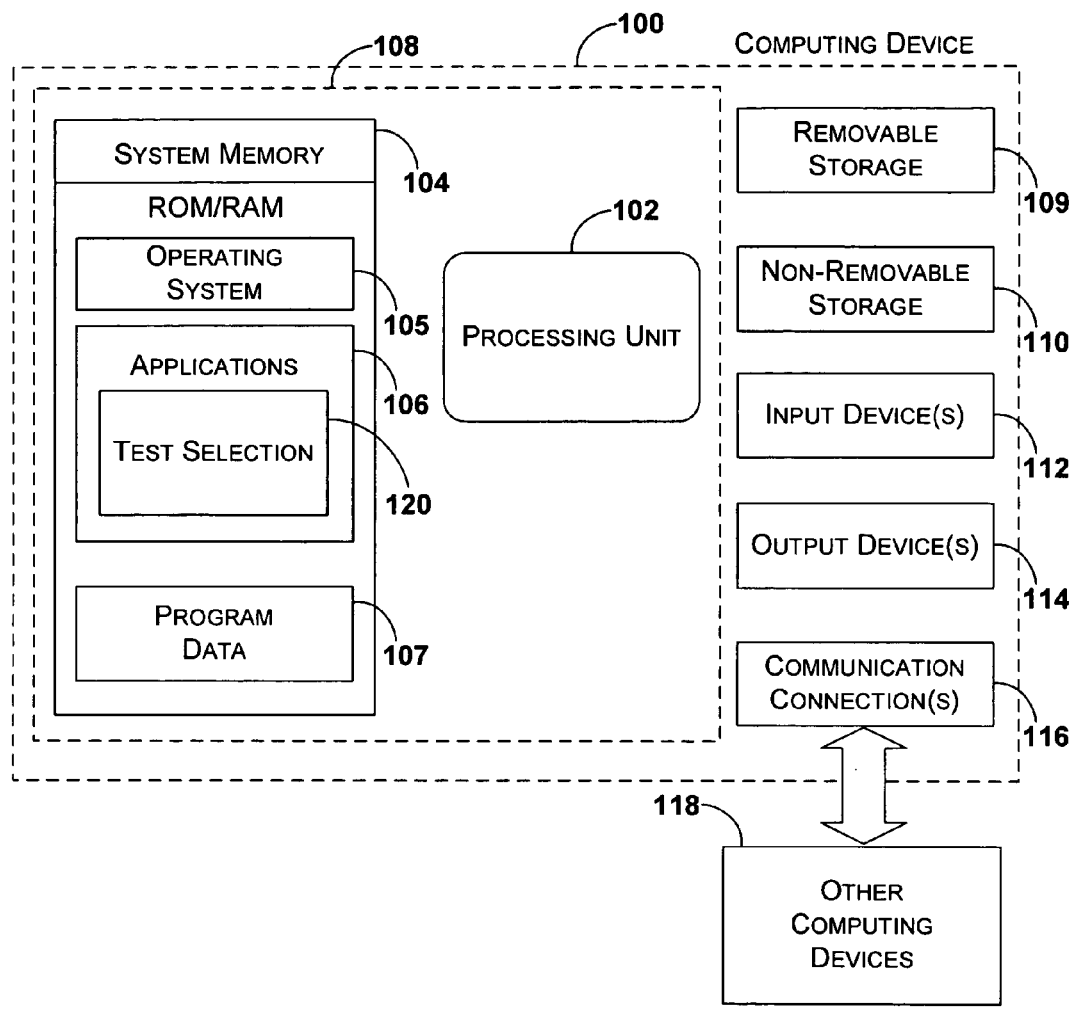
FIG. 1 illustrates an exemplary computing device that may be used in one aspect of the present invention.

Embodiments of the present invention will be described in detail with reference to the drawings, where like reference numerals represent like parts and assemblies throughout the several views. Reference to various embodiments does not limit the scope of the disclosure, which is limited only by the scope of the claims attached hereto. The examples set forth in this specification are not intended to be limiting and merely set forth some of the many possible embodiments. The following detailed description is, therefore, not to be taken in a limiting sense.

Illustrative Embodiments of Code Coverage Test Selection

Succinctly stated, aspects of the present disclosure are related to coverage test selection in order to increase efficiency of testing code data. As a succinct summation of a few functional aspects of the present disclosure, a developer may test a program build without requiring testing of the entire build. Such functionality promotes test efficiency, decreases machine hours required to test program modifications, and provides incentives for a program developer to test a program.

As one succinct example of the functionality and usefulness of the disclosure set forth herein, one or more program developers may write a baseline build (e.g. initial program build) for a program. Also, one or more testers may develop tests to test code of the baseline build in order to determine whether or not the baseline build is properly developed or to identify flaws in the code of the baseline build.

In one general aspect, during testing of the baseline build code coverage data is generated. The code coverage data of the baseline build identifies what tests "hit" or are associated with what code paths of the baseline build. For example, a baseline build may require a plurality of different tests to test all the code of a baseline build. Each of these tests may test one portion of code. The code coverage data identifies which test implicates which code path of the baseline build.

Aspects may also include a developer making modifications to the baseline build (e.g. modified build). Modifications may occur when a developer decides to change a baseline build after it has been tested. The developer may make modifications to improve a program as a quality control procedure, as part of a development process, to fix programming errors or for any other reason that code is modified. Such modifications may include modifying code associated with a code path of the baseline build. In such a situation, the modified build may be differentiated to determine what code of the modified build was changed. Differentiation may include comparing the code of the modified build to the code of the baseline build to determine what, if any, differences exist. For example, a modified build may include code that is identical to the code of the baseline build and some code that is different than the code of the baseline build. In one aspect, code paths that are not modified are not retested. The modified code may be associated with an appropriate code path of the modified build. Once the modified build is differentiated, the code coverage data for the modified code paths is mapped to appropriate tests. The tests may then be used to test the changed code paths without requiring testing of all the code paths of the modified build.

Figure 3:
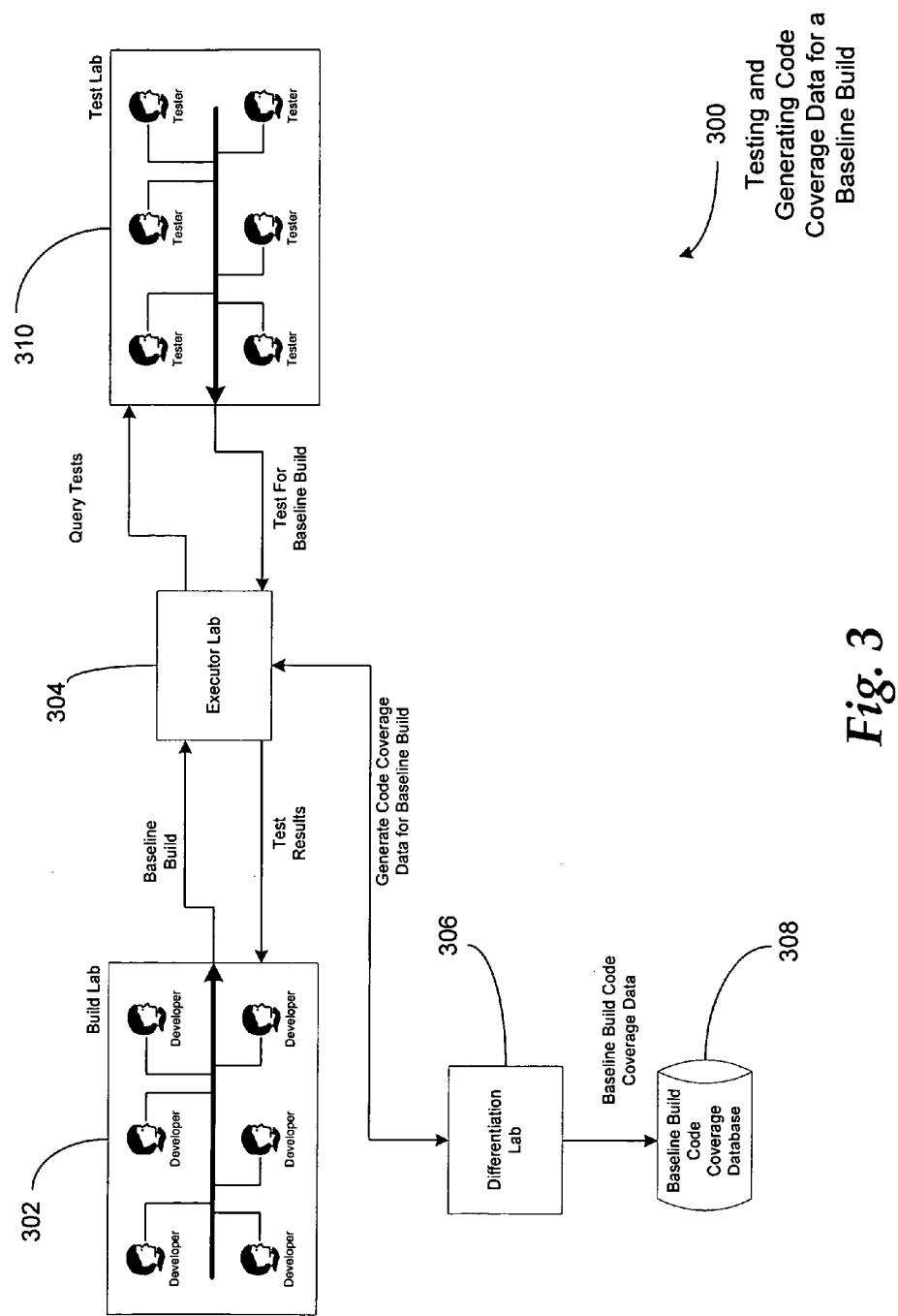
FIG. 3 represents one exemplary overview for testing and generating code coverage data for a baseline build.
Figure 4:
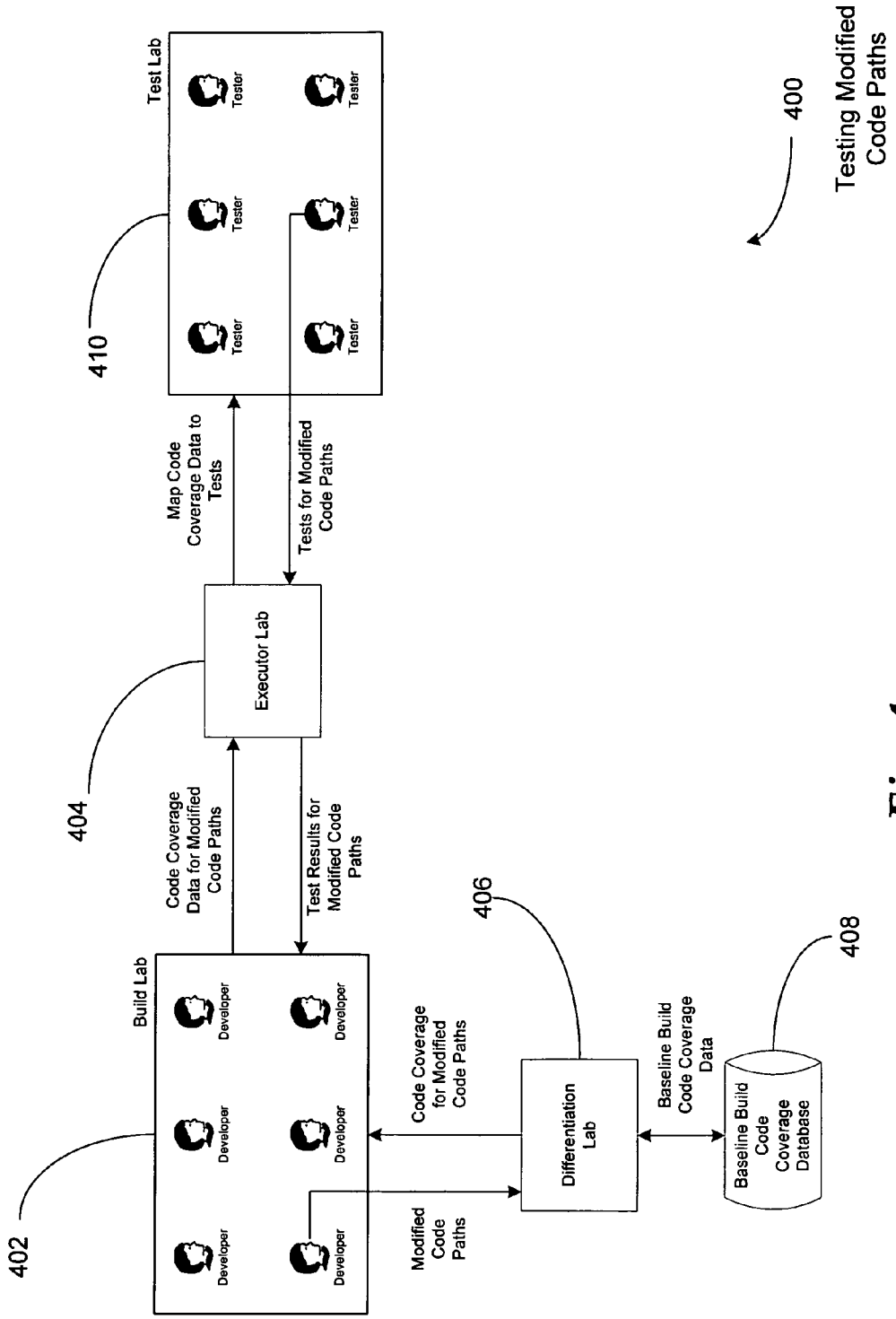
FIG. 4 represents one exemplary overview for testing modified code paths.

FIG. 3 represents one exemplary system overview 300 for testing and generating code coverage data for a baseline build. FIG. 4 represents one exemplary system 400 for testing modified code paths of a modified build. Systems 300 and 400 represent a general modular overview of the disclosure herein. Systems 300 and 400 may include the same modular elements being represented during different processes. Systems 300 and 400 may be integrated as a combination of software and hardware elements, an operating system or any combination thereof. Hardware, databases, software or applications referenced herein may be integrated as a single element or include various elements in communication with one another.

Software and/or hardware elements are depicted herein for explanatory purposes only and not for limiting the configuration to multiple elements or a single element performing several functions. Systems 300 and 400 may "live on" a single computing device or a plurality of computing devices and servers in communication with one another. Aspects of systems 300 and 400 may include computing device 100 as exemplified in FIG. 1 and/or mobile computing device 200 as exemplified in FIG. 2.

In FIG. 3, system 300 may include build lab 302, executor lab 304, differentiation lab 306, baseline build code coverage database 308, and test lab 310. Reference numbers 302-310 may include separate programs, separate databases, separate computing devices and separate hardware. Reference numbers 302-310 may also include multiple programs, databases, computing devices, hardware or any combination thereof. Likewise, in FIG. 4, system 400 may include build lab 402, executor lab 404, differentiation lab 406, baseline build code coverage database 408, and test lab 410. Reference numbers 402-410 may include separate programs, separate databases, separate computing devices and separate hardware. Reference numbers 402-410 may also include multiple programs, databases, computing devices, hardware or any combination thereof.

In FIG. 3, system 300 may include build lab 302. Build lab 302 may include one or more program developers developing code for a baseline build. Build lab 302 may include a plurality of computing devices where each developer is responsible for developing one portion of a baseline build. Each portion of code of the baseline build may be integrated to form a single baseline build program. Build lab 302 may have various configurations. With respect to MICROSOFT OFFICE from MICROSOFT CORPORATION, headquartered in Redmond, Wash., build lab 302 may include over nine hundred developers each developing a portion of code. Even though build lab 302 is depicted as including a plurality of developers, build lab 302 may include a single developer, a plurality of developers, a single build lab, a plurality of build labs or any combination thereof sufficient to develop code for a baseline build.

Once the code for the baseline build has been developed, the baseline build may be submitted to executor lab 304 where tests are executed on the baseline build. In one embodiment, executor lab 304 is a program associated with build lab 302. For example, executor lab 304 may include a program that executes on each of the developers computing devices. In another embodiment, executor lab 304 is a separate server that performs the processes set forth in systems 300 and 400.

Test lab 310 may include one or more program testers developing tests for the code of the baseline build. Test lab 310 may include a plurality of computing devices where each tester is responsible for developing tests for one portion of code of the baseline build. As one example, with respect to MICROSOFT OFFICE, test lab 310 may include over thirteen hundred testers each developing tests for the baseline build. Even though test lab 310 is depicted to include a plurality of testers, test lab 310 may include a single tester, a plurality of testers, a single test lab, a plurality of test labs or any combination thereof sufficient to test a baseline build.

In accordance with one aspect, test lab 310 includes a database where the tests are stored. The database may include a relational database. Test lab 310 may include any type of database sufficient to store tests and/or associate tests with a query. In one embodiment, test lab 310 includes a log file that associates tests with an appropriate code path. In another embodiment, an identifier identifies each test. The identifier may include a flag, a marker or any other type of identifier for identifying data in a computing system. In yet another embodiment, aspects of test lab 310 provide for the execution of tests against a program build.

Executor lab 304 may query test lab 310 for the tests that are associated with the code of the baseline build. In one embodiment, each test of test lab 310 is associated with a code path of the baseline build. Test lab 310 returns the tests associated with the code paths of the baseline build. In one embodiment, a test may not exist for a code path associated with the baseline build. Executor lab 304 may recognize that a code path does not have an associated test when the test lab is queried. In such a situation, executor lab 304 may generate a notification indicating that a test does not exist. Such a notification is then made available to testers associated with test lab 310 so that a test may be developed. Where tests do exist, executor lab 304 executes the tests that are associated with their respective code path and returns test results to build lab 302 for evaluation by the developers.

Differentiation lab 306 includes a tool for generating code coverage data of a baseline build and a database for storing the code coverage data. As referenced herein, code coverage data may include trace data or data associated with a plurality of traces. Differentiation lab 306 traces the baseline build to determine which tests from test lab 310 implicate which code paths of the baseline build. As referenced herein, a code path may include a block of data, a plurality of blocks, an arc, a plurality of arcs and/or any combination of blocks and arcs. The code coverage data may include an identifier of the test that "hit" or is associated with a code path. The code coverage data may be stored in baseline build code coverage database 308. Baseline build code coverage database 308 may include a relational database. Also, baseline build code coverage database 308 may include any type of database sufficient to store code coverage data.

Differentiation lab 306 may perform other functions, as is further set forth in reference to FIG. 4. For example, in another embodiment, differentiation lab 306 also includes a differentiation tool for comparing a modified build to a baseline build to determine what code paths have been modified. In one embodiment, differentiation lab 306 is a program associated with build lab 302. In another embodiment, differentiation lab 306 is a separate server that performs the processes set forth in systems 300 and 400.

FIG. 4 represents one exemplary system overview 400 for testing modified code paths. In one aspect, the process represented by system 400 is executed after the process represented by system 300 is executed. For example, system 300 represents aspects of the process of collecting data regarding the baseline build. System 400 represents aspects of the process of comparing a modified build to the collected data in order to identify which portions of the code have been modified.

Build lab 402 is described above in reference to build lab 302 in FIG. 3. Build lab 402 may include one or more program developers developing code for a modified build. As indicated by build lab 402, build lab 402 may include a single program developer modifying a portion of code associated with a baseline build. The modified build may include a portion of code that is different than the baseline build. The modified code may be associated with a code path of the modified build.

The modified build is differentiated by differentiation lab 406. Differentiation lab 406 determines what code paths in the modified build are different from the code paths of the baseline build. In doing so, differentiation lab 406 compares the code paths of the modified build to the code paths of the baseline build. After identifying modified code paths, differentiation lab 406 matches the modified code paths to code coverage data stored in baseline build code coverage database 408. As stated above, the matched code coverage data identifies a test that is associated with the modified code path.

Figure 5:
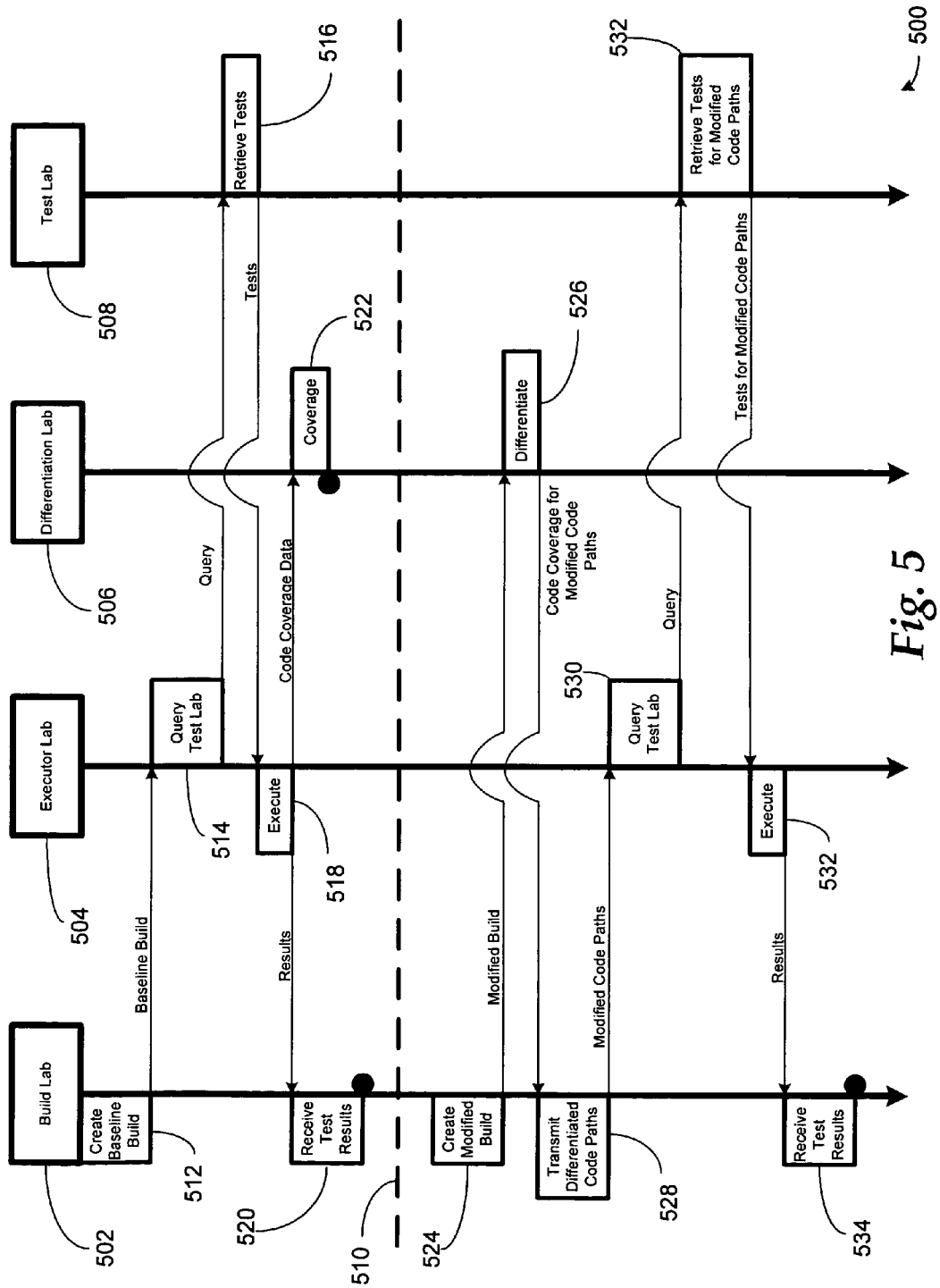
FIG. 5 represents an exemplary time-dependent flow diagram of one aspect of the present invention.

Executor lab 404 is described above in association with FIG. 3. Executor lab 404 transmits the code coverage data to the test lab so that the code coverage data may be mapped to their associated tests. As stated in reference to FIG. 3, the code coverage data may include an identifier of the test that "hit" or tested a code path of the baseline build. In one embodiment, mapping includes querying test lab 410 for the tests indicated by the one or more identifiers of the code coverage data. Test lab 410 may transmit the appropriate test or tests to executor lab 404 and the tests may be executed on the modified code path. Test results are returned to build lab 302 for evaluation by the developers. In this manner, a modified code path may be tested without requiring testing of the entire build FIG. 5 represents one exemplary time-dependent flow diagram of process 500. Build lab 502, executor lab 504, differentiation lab 506 and test lab 508 are described above in accordance with FIGS. 3 and 4. The arrows extending from reference numbers 502-508 represent the passage of time. Blocks connected to the arrows represent steps of process 500. Dashed line 510 may represent a break in process 500. The break in process 500 may be a modification to a baseline build after the baseline build is tested.

Block 512 represents a step for creating a baseline build. One or more program developers developing code for the baseline build may create the baseline build. Each portion of code of the baseline build may be integrated to form a baseline build program. Once the baseline build is created, the baseline build is transmitted to executor lab 504. Although not necessary, the executor lab may query test lab 508 at block 514 for the appropriate tests to test the functionality of the code associated with the baseline build. In another aspect, one or more tests may be provided without querying the test lab. When a test does not exist for a set of code, the executor lab 504 may generate a notification indicating that a test does not exist. The notification is made available to test lab 508 so that a test may be developed.

Available tests are retrieved as indicated by block 516. Each test may be associated with a unique identifier. In accordance with one aspect, test lab 508 includes a database where the tests are stored. In one embodiment, test lab 508 includes a log file that associates tests with an appropriate code path. The tests are transmitted to executor lab 504 for execution as indicated by block 518. The results of the execution are transmitted to block 520 where the results are made available to build lab 502 for evaluation.

Differentiation lab 506 includes a tool for generating code coverage data for a baseline build and a database for storing code coverage data as indicated by block 522. Differentiation lab 506 traces the baseline build to determine which tests implicate which code paths of the baseline build. The code coverage data may include the identifier of the test.

Dashed line 510 may represent a break in process 500. Stated another way, a developer may modify the baseline build after code coverage data has been generated. Creating a modified build is represented by block 524 of process 500. The modified build may be transmitted to differentiation lab 506 for differentiation as indicated by block 526. Differentiation lab 506 determines what code paths in the modified build are different from the code paths in the baseline build. In doing so, differentiation lab 506 compares the code of the modified build to the code of the baseline build to identify modified paths of code. After identifying modified paths of code, differentiation lab 506 matches the modified paths of code to the code coverage data. The matched code coverage data identifies one or more tests that are associated with the modified paths of code.

The code coverage data is transmitted to build lab 502. Build lab 502 transmits the code coverage data to executor lab 504 as indicated by block 528. In one embodiment, executor lab 504 may send a query to the test lab as indicated by block 530. Executor lab 504 transmits the code coverage data to test lab 508 so that the code coverage data may be mapped to their associated tests. In one embodiment, mapping includes querying test lab 508 for the tests indicated by the one or more identifiers of the code coverage data. Test lab 508 may transmit the appropriate test or tests back to executor lab 504 and the tests may be executed as indicated by block 532. Test results are returned to build lab 502 for evaluation by the developers as indicated by block 534.

Figure 6:
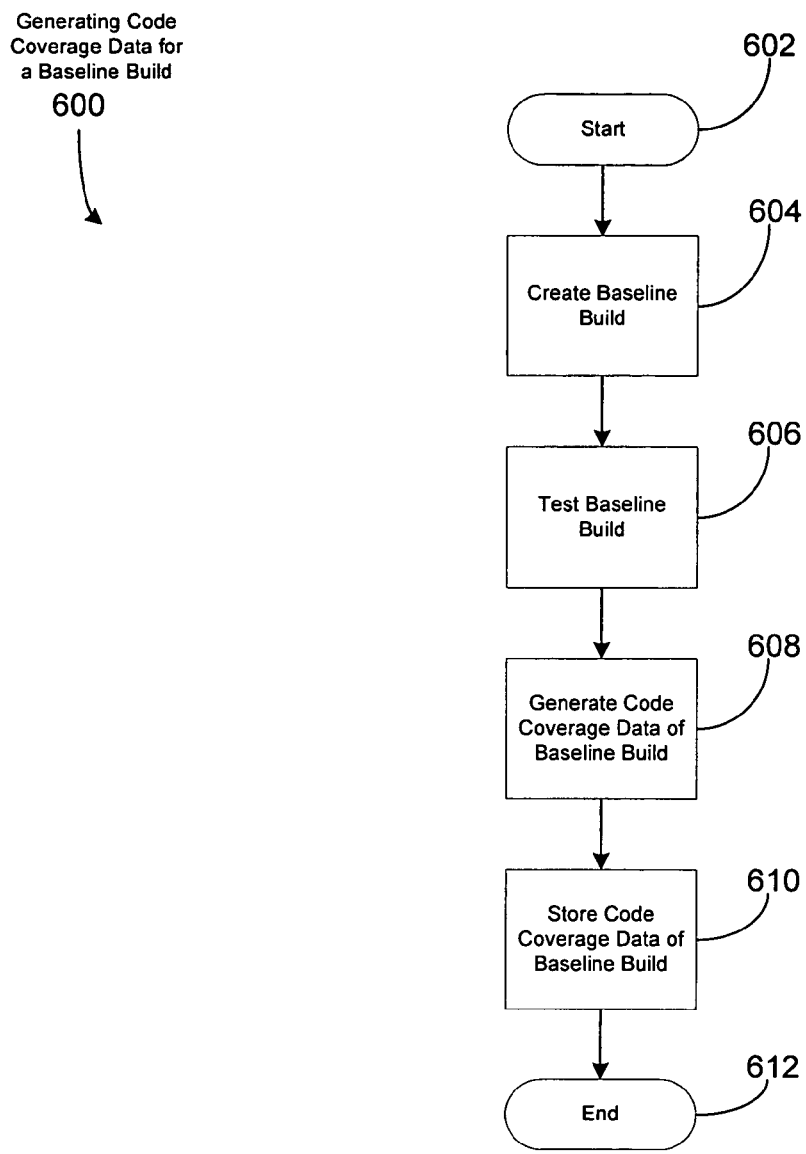
FIG. 6 represents a logical flow diagram of one embodiment for generating code coverage data for a baseline build.

FIG. 6 represents a logical flow diagram of one embodiment for generating code coverage data for a baseline build. Process 600 starts at starting block 602 and flows to block 604 where a baseline build is created. The baseline build may include a plurality of blocks of code assembled to form a program. Process 600 flows to block 606 where the baseline build is tested. Testing the baseline build may include a plurality of tests. Each test may test a portion of code or a path of code of the baseline build. In one embodiment, a notification is generated when a test does not exist for a portion of code. The notification may be transmitted to a test lab so that a test is developed. Each test that is executed on the baseline build may include an associated identifier to distinguish the test from other tests executed on the baseline build.

Process 600 flows to block 608 where code coverage data of the baseline build is generated. The code coverage data of the baseline build may identify tests that "hit" code paths of the baseline build. In one embodiment, the code coverage data includes the identifier of the test. At block 610 the code coverage data of the baseline build is stored. Storage of the baseline build may include storing data associated with test data that "hits" a particular code path of the baseline build. Storage may include storing code coverage data in a relational database.

Figure 7:
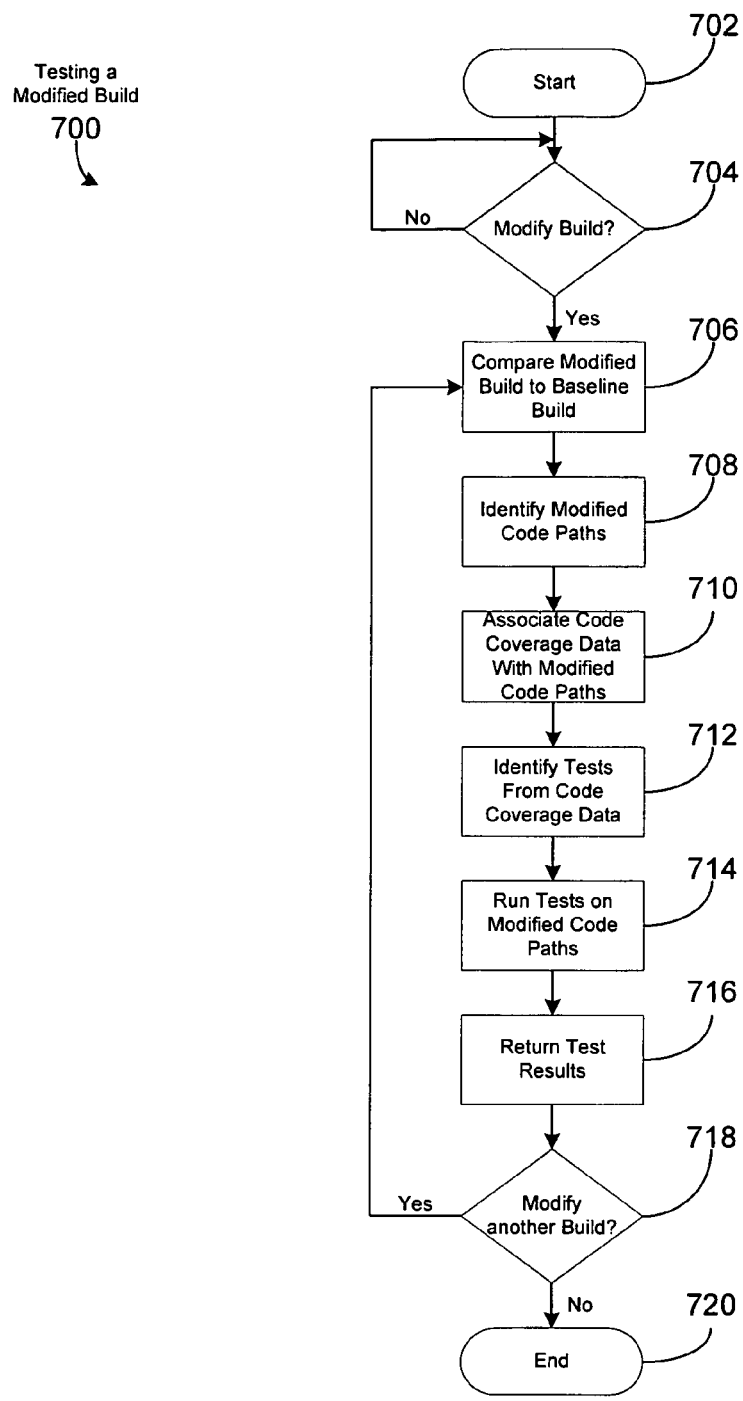
FIG. 7 represents a logical flow diagram of one embodiment for testing a modified build.

FIG. 7 represents a logical flow diagram of one embodiment for testing a modified build. Process 700 starts at starting block 702 and flows to decision block 704 where it is determined whether to modify a build. Where a build is not modified, process 700 loops until a build is modified. Where a build is modified, process 700 continues to block 706 where the modified build is compared to the baseline build. In doing so, the code of the modified build is compared to the code of the baseline build to determine changes in the code. The modified code is associated with code paths of the modified build as indicated by step 708.

After identifying modified code paths, the modified code paths are associated with the code coverage data of the baseline build. The code coverage data identifies the test that is associated with the modified code path. The code coverage data may identify the test by an identifier associated with the code coverage data. The tests that are associated with the modified code paths are executed to test the modified code paths as indicated by step 714. Process 700 then flows to block 716 where the test results are made accessible for review.

At block 718, process 700 decides whether to modify another build. When another build is to be modified, process 700 loops back to block 706 as indicated above. When the process 700 decides not to modify another build, process 700 continues to end block 720.

As discussed herein, the present invention provides a system and method for testing a modified build without requiring testing of the entire build. Such an invention promotes test efficiency, decreases machine hours required to test program modifications, and provides incentives for a program developer to test a modified build.

Illustrative Operating Environment

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include application 120 for test selection. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. All these devices are known in the art and need not be discussed at length here.

Computing device 100 also contains communication connection(s) 116 that allow the device to communicate with other computing devices 118, such as over a network or a wireless mesh network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
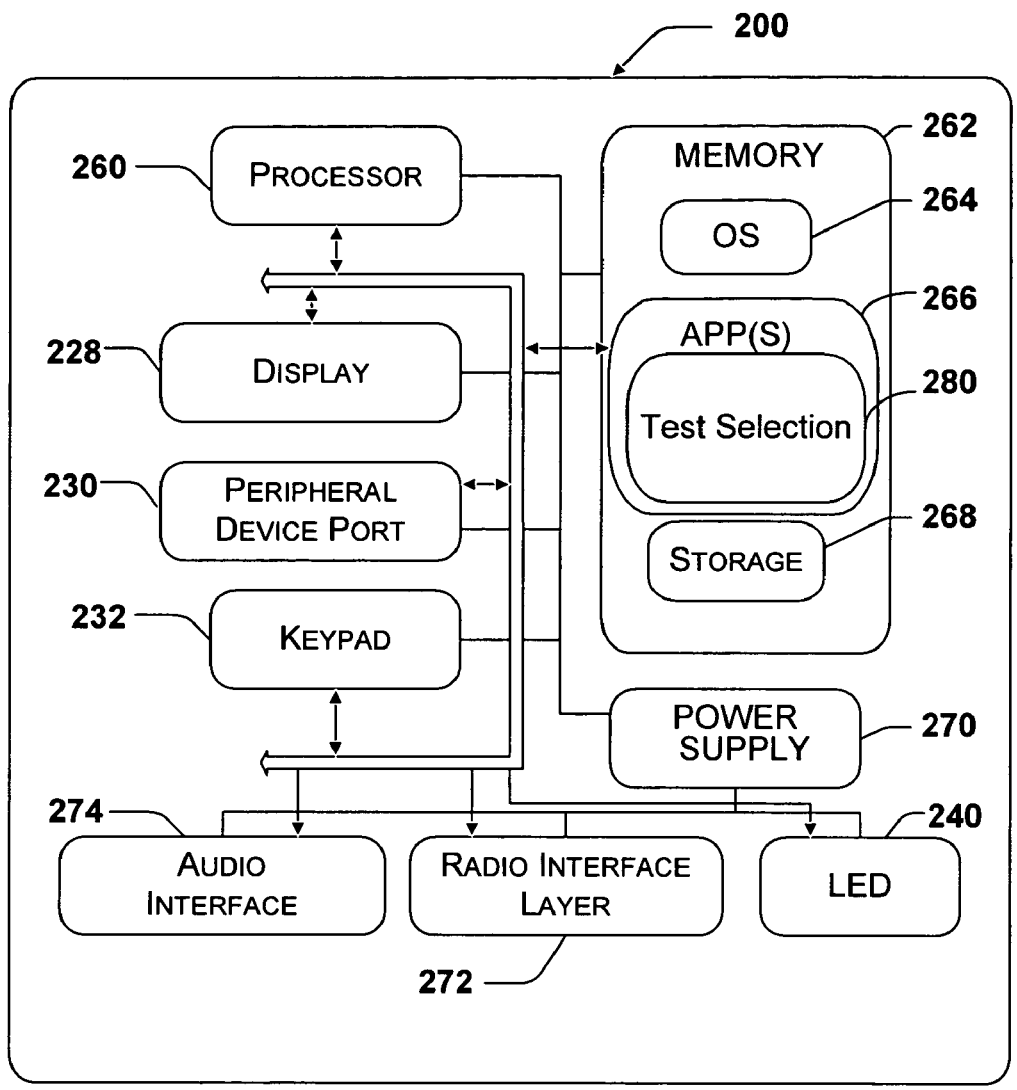
FIG. 2 illustrates an exemplary mobile device that may be used in one aspect of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, which is resident in memory 262 and executes on processor 260. Keypad 232 may be a push button numeric dialing pad (such as on a typical telephone), or a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. Mobile computing device 200 also includes non-volatile storage 268 within memory 262. Non-volatile storage 268 may be used to store persistent information which should not be lost if mobile computing device 200 is powered down. Applications 266 may use and store information in storage 268, such as e-mail or other messages used by an e-mail application, contact information used by a PIM, appointment information used by a scheduling program, documents used by a word processing application, and the like. In one embodiment, applications 266 further include application 280 for test selection.

Mobile computing device 200 has power supply 270, which may be implemented as one or more batteries. Power supply 270 might further include an external power source, such as an AC adapter or a powered docking cradle that supplements or recharges the batteries.

Mobile computing device 200 is shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes radio interface layer 272 that performs the function of transmitting and receiving communications, such as radio frequency communications. Radio interface layer 272 facilitates wireless connectivity between mobile computing device 200 and the outside world, via a communications carrier or service provider. Transmissions to and from radio interface layer 272 are conducted under control of operating system 264. In other words, communications received by radio interface layer 272 may be disseminated to application programs 266 via operating system 264, and vice versa.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for testing a modified build based on tests ran on an initial baseline build, the computer-implemented method comprising:
   generating an initial baseline build of a software program, wherein the initial baseline build of the software program includes a plurality of code paths;
   testing the initial baseline build with a plurality of tests to produce test results for the initial baseline build of the software program, wherein each of the tests includes an identifier that indicates the respective test;
   during the testing of the initial baseline build of the software program, logging, via a trace, an identifier of any test that hits a respective code path of the initial baseline build of the software program;
   storing, in a log file, the identifiers of any tests that hit respective code paths of the initial baseline build as code coverage date of the initial baseline build of the software program;
   after testing the initial baseline build of the software program, utilizing the code coverage data of tests ran on the initial baseline build to test a modified build of the initial baseline build, wherein utilizing the code coverage data includes:
      receiving a modification to at least one code path of the initial baseline build to generate the modified build of the software program,
      comparing the modified build to the initial baseline build to identify at least one code path implicated by the modification,
      obtaining only an identifier, from the code coverage data, that hit the at least one code path implicated by the modification,
      obtaining only the test indicated by the identifier, and
      causing the execution of only the test indicated by the identifier on the code path implicated by the modification in order to test the modified build.

2. The computer-implemented method of claim 1, wherein the log file is stored with a test lab that stores the plurality of tests.

3. The computer-implemented method of claim 2, wherein comparing the modified build to the initial baseline build to identify at least one code path implicated by the modification includes causing the comparison on a differentiation lab, wherein the comparison causes retrieval of code coverage data from a code coverage database in communication with the differentiation lab.

4. The computer-implemented method of claim 3, wherein code coverage data is received on an executor lab, wherein the execution lab sends a query to the test lab to map the code coverage data to tests in order to obtain tests identified by the identifier of the test implicated by the code path of the modified build.

5. The computer-implemented method of claim 4, further comprising sending a notification from the executor lab to the test lab, wherein the notification provides an indication to generate a test when the query indicates that no test is available for the code path.

6. A computer-readable storage medium having computer-executable instructions for testing a modified build based on tests ran on an initial baseline build, the instructions comprising:
   generating an initial baseline build of a software program, wherein the initial baseline build of the software program includes a plurality of code paths;
   testing the initial baseline build with a plurality of tests to produce test results for the initial baseline build of the software program, wherein each of the tests includes an identifier that indicates the respective test;
   during the testing of the initial baseline build of the software program, logging, via a trace, an identifier of any test that hits a respective code path of the initial baseline build of the software program;
   storing, in a log file, the identifiers of any tests that hit respective code paths of the initial baseline build as code coverage date of the initial baseline build of the software program;
   after testing the initial baseline build of the software program, utilizing the code coverage data of tests ran on the initial baseline build to test a modified build of the initial baseline build, wherein utilizing the code coverage data includes:
      receiving a modification to at least one code path of the initial baseline build to generate the modified build of the software program,
      comparing the modified build to the initial baseline build to identify at least one code path implicated by the modification,
      obtaining only an identifier, from the code coverage data, that hit the at least one code path implicated by the modification,
      obtaining only the test indicated by the identifier, and
      causing the execution of only the test indicated by the identifier on the code path implicated by the modification in order to test the modified build.

7. The computer-readable storage medium of claim 6, wherein the log file is stored with a test lab that stores the plurality of tests.

8. The computer-readable storage medium of claim 7, wherein comparing the modified build to the initial baseline build to identify at least one code path implicated by the modification includes causing the comparison on a differentiation lab, wherein the comparison causes retrieval of code coverage data from a code coverage database in communication with the differentiation lab.

9. The computer-readable storage medium of claim 8, wherein code coverage data is received on an executor lab, wherein the execution lab sends a query to the test lab to map the code coverage data to tests in order to obtain tests identified by the identifier of the test implicated by the code path of the modified build.

10. The computer-readable storage medium of claim 9, further comprising sending a notification from the executor lab to the test lab, wherein the notification provides an indication to generate a test when the query indicates that no test is available for the code path.

11. A system for testing a modified build based on tests ran on an initial baseline build, the system comprising:
- a processor; and
- a computer readable storage medium having computer executable instructions stored thereon, wherein the instructions are configured for:
  - generating an initial baseline build of a software program, wherein the initial baseline build of the software program includes a plurality of code paths;
  - testing the initial baseline build with a plurality of tests to produce test results for the initial baseline build of the software program, wherein each of the tests includes an identifier that indicates the respective test;
  - during the testing of the initial baseline build of the software program, logging, via a trace, an identifier of any test that hits a respective code path of the initial baseline build of the software program;
  - storing, in a log file, the identifiers of any tests that hit respective code paths of the initial baseline build as code coverage date of the initial baseline build of the software program;
  - after testing the initial baseline build of the software program, utilizing the code coverage data of tests ran on the initial baseline build to test a modified build of the initial baseline build, wherein utilizing the code coverage data includes:
    - receiving a modification to at least one code path of the initial baseline build to generate the modified build of the software program,
    - comparing the modified build to the initial baseline build to identify at least one code path implicated by the modification,
    - obtaining only an identifier, from the code coverage data, that hit the at least one code path implicated by the modification,
    - obtaining only the test indicated by the identifier, and
    - causing the execution of only the test indicated by the identifier on the code path implicated by the modification in order to test the modified build.

12. The system of claim 11, wherein the log file is stored with a test lab that stores the plurality of tests.

13. The system of claim 12, wherein comparing the modified build to the initial baseline build to identify at least one code path implicated by the modification includes causing the comparison on a differentiation lab, wherein the comparison causes retrieval of code coverage data from a code coverage database in communication with the differentiation lab.

14. The system of claim 13, wherein code coverage data is received on an executor lab, wherein the execution lab sends a query to the test lab to map the code coverage data to tests in order to obtain tests identified by the identifier of the test implicated by the code path of the modified build.

15. The system of claim 14, further comprising sending a notification from the executor lab to the test lab, wherein the notification provides an indication to generate a test when the query indicates that no test is available for the code path.

* * * * *